Nov. 4, 1924.
F. C. MORTON
1,513,850
REEL FOR STRIP MATERIAL
Filed Feb. 11, 1924
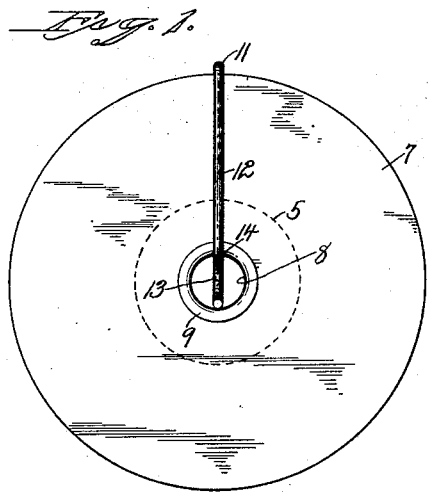
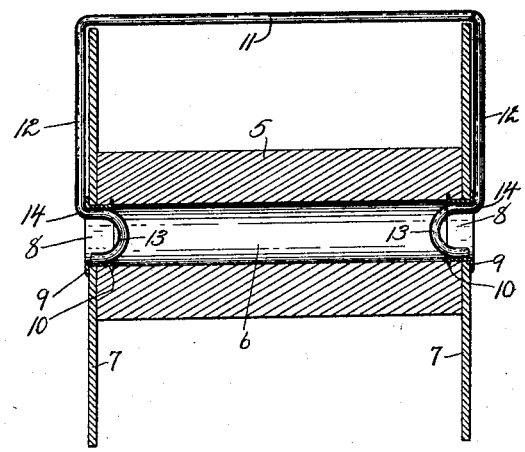
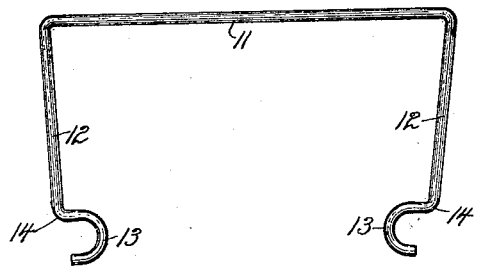
Inventor
Frederic C. Morton
by Seymour Earle
atty Patented Nov. 4, 1924.

1,513,850

UNITED STATES PATENT OFFICE.

FREDERIC C. MORTON, OF NEW HAVEN, CONNECTICUT, ASSIGNOR TO THE ANSONIA O & C CO., OF ANSONIA, CONNECTICUT, A CORPORATION.

REEL FOR STRIP MATERIAL.

Application filed February 11, 1924. Serial No. 692,007.

*To all whom it may concern:*

Be it known that I, FREDERIC C. MORTON, a citizen of the United States, residing at New Haven, in the county of New Haven and State of Connecticut, have invented a new and useful Improvement in Reels for Strip Material; and I do hereby declare the following, when taken in connection with the accompanying drawings and the characters of reference marked thereon, to be a full, clear, and exact description of the same, and which said drawings constitute part of this application, and represent, in—

Fig. 1 a side view of a reel for strip material constructed in accordance with my invention.

Fig. 2 a sectional view of the same.

Fig. 3 a face view of the bale, detached.

This invention relates to improvement in reels for strip material, such as ribbon, braid, elastic webbing, and similar materials. A common form of reel consists of a spool comprising a tubular, central portion, formed from wood, with disks applied to the ends thereof, and a wire bale having its ends turned into the spool, but in the usual construction of these devices, the bale is free to swing around the spool, so it does not always hold the free end of the strip, and the bale does not properly support the spool when the strip is drawn therefrom. The object of this invention is to form the bale with bearings which will closely fit the openings in the spool, so that it will stay in any position, and the invention consists in the construction as will be hereinafter described and particularly recited in the claim.

In carrying out my invention, I form the spool from a cylindrical block 5 of wood or other suitable material, formed with a longitudinal round hole 6. Applied to the ends of the block are end disks 7 usually formed of from cardboard, and fixed to the ends of the block by bushings 8 having flanges 9 which bear upon the outer surface of the disk and inner flanges 10, which are forced into the block so as to firmly secure the disks to the block, and forming a bushing at each end of the spool. The bale 11 is formed from a strip of spring wire of suitable length, the central portion being straight, the ends 12 inclined inward, and the tips 13 formed with semicircular bends, the diameter of the bends corresponding substantially to the diameter of the bushings 8, and these bends extend inward, so as to project into and have a bearing in the bushings 8. The length of the ends to the bends correspond substantially to the distance from the edges of the bushings to the edges of the disks. These bends not only give a firm support for the bale, but provide smooth surfaces which will ride over the outer faces of the disks without marring them, so that less care is required in applying the bales than is necessary when they are provided with inwardly-projecting ends which would scratch the surface of the disks. In its normal state, the distance between the ends of the bale at the tips is less than the length of the spool, so that the bends 14 of the bale tend to grip the bushing and so be frictionally held. With this construction, the bale will stand in a radial position at any desired angle, and so closely fit the disks that material will not slip between the bale and disks.

I claim:

A reel for strip material, comprising a block formed with a longitudinal hole, disks applied to the ends of the said block and connected therewith by bushings, and a bale consisting of a straight, central portion crossing the edges of the two disks, the ends of the bale turned inward over the outer faces of said disks and terminating in semicircular bends adapted to closely fit into said bushings, the length of the ends of the bends corresponding to the distance from the edges of the bushings to the edges of the disks.

In testimony whereof, I have signed this specification in the presence of two subscribing witnesses.

FREDERIC C. MORTON.

Witnesses:
FREDERIC C. EARLE,
MALCOLM P. NICHOLS.